May 14, 1946.                W. W. REESER                    2,400,371
                  SELF-ADAPTING AND ADJUSTING DEPTH GAUGE
                           Filed April 24, 1944
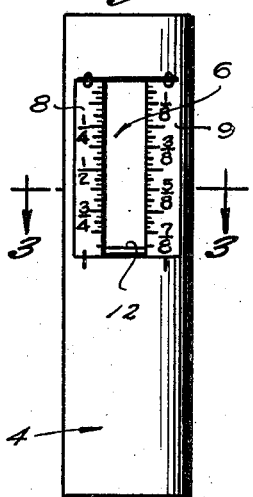
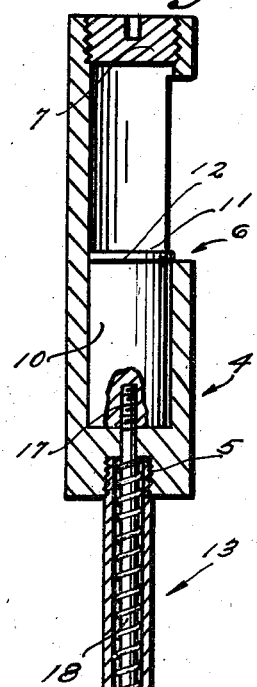
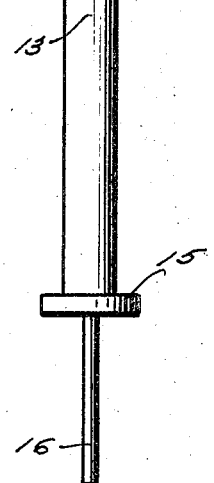
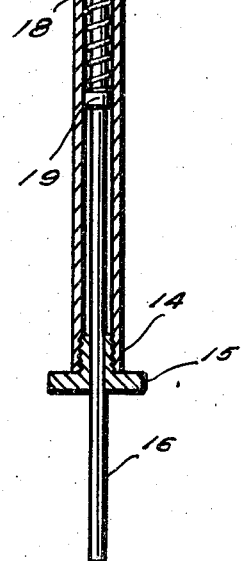
Inventor
Woodrow W. Reeser
By Clarence A. O'Brien
and Harvey B. Jackson
Attorneys Patented May 14, 1946

2,400,371

UNITED STATES PATENT OFFICE 2,400,371

SELF-ADAPTING AND ADJUSTING DEPTH GAUGE

Woodrow W. Reeser, Elyria, Ohio, assignor of one-half to Lucille E. Reeser, Elyria, Ohio Application April 24, 1944, Serial No. 532,480

3 Claims. (Cl. 33—169)

This invention relates to a novel and improved gauge which is expressly adapted to be placed in a bore or socket for purposes of measuring the depth thereof in relation to a given or predetermined surface.

Briefly, the preferred embodiment of the invention comprises a cylindrical casing having suitably calibrated scales, an indicator slidable in the casing and coacting with said scales, and projectible and retractible means for actuating the indicator, said means being preferably in the form of a metering and feeler rod such as is insertable into the socket to be measured or gauged.

My aim is to generally improve upon depth gauges in the same general category by providing a structure of a precision type which aptly fulfills the purposes and requirements of the manufacturer, user and trade in general and which is otherwise in keeping with approximate needs of the trade due to its simplicity, expediency in handling, and accuracy in results.

Other features and advantages will become more readily apparent from the following description and the accompanying illustrative drawing.

In the drawing, wherein like numerals are employed to designate like parts throughout the same:

Figure 1 is an elevational view of a gauge constructed in accordance with the structural and functional principles of the instant invention.

Figure 2 is a longitudinal sectional view with parts in elevation.

Figure 3 is cross-section on the plane of the line 3—3 of Figure 1, looking in the direction of the arrows.

Referring now to the drawing by distinguishing reference numerals, the numeral 4 designates the indicator casing, this being of appropriate dimension and material. As brought out in Figure 2, it is provided in its closed bottom with a screw-threaded socket 5, is provided on one side intermediate its ends with a slot 6 forming a sight and the upper end is internally screw-threaded to accommodate an assembling and closing plug 7. On opposite longitudinal sides of the slot it is provided with suitably calibrated scales 8 and 9, preferably graduated in sixteenths of an inch, the numerical indicia being staggered on alternate sides of the slot to facilitate handling and reading. The entire length of the slot, in this particular instance, is one inch, the graduations running from zero at the top to "1" at the bottom.

The indicator element 10 is cylindrical in cross-sectional form and is slidable in the bore of the casing or cylinder. It is obviously arranged to coact with the slot and the graduations forming the scales on opposite sides of the slot in order to visibly disclose the gauging measurements and results. The top end 11 projects slightly above the bottom end of the sight or slot 6. This is brought out in Figures 1 and 2. The gauge line (representing three sixty-fourths of an inch in relation to a distance below the top 11) is indicated at 12 and this registers with the bottom of the slot and the graduations or scale indicia in registry therewith.

I next call attention to a sheath-like tube 13 which has its inner end threaded in the socket 5 and has its outer end internally screw-threaded to accommodate a screw-threaded neck 14 on an adapter collar 15. In practice, I provide a series of collars of different and varying diameters to fit into the bores or sockets in which the adapter-equipped end of the tube is inserted for depth measuring purposes.

The aforementioned feeler rod, which is the principal metering element, is of a projectible and retractible type and is denoted by the numeral 16. This is slidable through the fitting 14 which then functions as a bushing and has its upper end screw-threaded and tapped as at 17 into the bottom of the indicator slide 10. A coiled spring 18 surrounds the rod and bears at its lower end against a collar or shoulder 19 carried by the intermediate portion of the rod and having snug fit, slidably of course, in the bore of the sleeve or tube 14. The tension of the spring and associated parts are such that the projecting end of the metering rod 16 extends exactly one inch beyond the adapter collar 15. Thus, this one inch dimension corresponds with the one inch dimension of the scaled slot 16 in the indicator casing. Whatever distance the projecting end of the metering rod is forced into the tube 13 against the tension of the spring, the slide 10 travels a corresponding distance in the relatively stationary gauge casing 4. Thus the index line 12 on said indicator 10 coacts with the scales on opposite side of the slot to measure the distance of movement of the projectible end of the metering rod. In practice, I intend constructing a precision type instrument with all of the parts carefully chosen and assembled to insure effective and reliable results. Of course, the nature of materials and the overall measurements of the device for handling different depths and diameters of sockets will, naturally, vary.

Although it is of incidental importance it will be noted that the plug 7 terminates at a point in relation to the upper end of the socket as to provide clearance for that portion of the adjacent or upper end of the indicator 10 which projects beyond the index or measuring line 12.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a gauge of the class described, a cylinder having a bore at one end, and being internally screw-threaded at its opposite end and provided in one side with a longitudinal slot, a screw-plug closing said screw threaded end, said slot being provided on opposite edges with graduations forming individually and collectively readable scales, a feeler rod slidable through the bore in the first-named end of the cylinder, a cylindrical indicator element slidable in said cylinder and having an index cooperable with the scales, said rod being connected with said indicator element, a tube connected to the cylinder, said rod extending through said tube, and an adapter on the outer end of said tube removably attached thereto, the outer end of the rod projecting beyond the adapter, and said rod having spring means located in said tube for holding the rod normally projected.

2. In a gauge of the class described, an elongated tube, a rod adapter fitting removably mounted in one end of said tube, said adapter being in the form of a margnally flanged bushing, a spring-pressed projectible and retractible rod fitted and slidably mounted in said tube, the outer end of said rod, adjacent the adapter, normally projecting beyond said adapter, a cylinder attached to the opposite end of the tube and provided with a fixed graduated scale, and a cylinder indicator wholly confined and slidable in said cylinder and having an index line cooperable with the graduations of said scale, said rod being connected with said indicator.

3. A self-adapted and adjusting depth gauge of the class described comprising a cylinder having an axial feeler rod accommodation bore at one end, said bore being counter-bored, and the counterbore screw-threaded, the opposite end of said cylinder being open and internally screw-threaded, said cylinder being provided on one side with a longitudinal slot forming a sight, said slot being provided on opposite edges with scale graduations, these forming individually and collectively usable and readable scales, a tube having its inner end screw threaded and threaded into said counter-bore, a flanged bushing in the outer end of said tube, a feeler rod slidable through said bore and located into the interior of the cylinder, a coiled spring surrounding said feeler rod and confined in said tube, this to project the feeler end of the rod outwardly beyond the bushing, a cylindrical indicator element slidable in said cylinder having an index cooperable with the scales, and a screw plug closing the screw-threaded end of said cylinder.

WOODROW W. REESER.